United States Patent
Homan et al.

(10) Patent No.: US 6,997,258 B2
(45) Date of Patent: Feb. 14, 2006

(54) APPARATUS AND METHODS FOR PRESSURE COMPENSATED CONTACT WITH THE BOREHOLE WALL

(75) Inventors: Dean M. Homan, Sugar Land, TX (US); Kuo-Chiang Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 87 days.

(21) Appl. No.: 10/605,200

(22) Filed: Sep. 15, 2003

(65) Prior Publication Data

US 2005/0056421 A1    Mar. 17, 2005

(51) Int. Cl.
*E21B 47/00* (2006.01)
*E21B 49/10* (2006.01)

(52) U.S. Cl. .................... 166/254.2; 166/100
(58) Field of Classification Search ............. 166/254.2, 166/66, 100, 113
See application file for complete search history.

(56) References Cited

U.S. PATENT DOCUMENTS

| | | |
|---|---|---|
| 3,788,136 A | 1/1974 | Park |
| 4,468,623 A | 8/1984 | Gianzero et al. |
| 4,567,759 A | 2/1986 | Ekstrom et al. |
| 5,235,285 A | 8/1993 | Clark et al. |
| 5,339,037 A | 8/1994 | Bonner et al. |
| 6,191,588 B1 | 2/2001 | Chen |
| 6,257,356 B1 * | 7/2001 | Wassell ................ 175/61 |
| 2002/0062992 A1 | 5/2002 | Fredericks et al. |
| 2004/0160858 A1 * | 8/2004 | Ciglenec et al. ........... 367/83 |

FOREIGN PATENT DOCUMENTS

| | | |
|---|---|---|
| EP | 0383536 | 8/1990 |
| GB | 2331314 | 5/1999 |
| RU | 2070290 | 12/1996 |

* cited by examiner

*Primary Examiner*—William Neuder
(74) *Attorney, Agent, or Firm*—Kevin P. McEnaney; Bryan L. White; Victor H. Segura (57) ABSTRACT

A well logging tool includes a housing; at least one piston moveably disposed on the housing; at least one sensor disposed on the at least one piston; a pressure compensation system coupled to the at least one piston such that a pressure at a back side of the at least one piston is substantially identical to a pressure outside the well logging tool; and a piston deployment mechanism for deploying the at least one piston. A method for well logging using a logging tool having at least one piston and a pressure compensating system, wherein the at least one piston includes at least one sensor, the method includes disposing the well logging tool in a borehole; deploying the at least one piston to establish a contact between the at least one piston and a wall of the borehole; and measuring a formation property using the at least one sensor.

15 Claims, 5 Drawing Sheets

APPARATUS AND METHODS FOR PRESSURE COMPENSATED CONTACT WITH THE BOREHOLE WALL

BACKGROUND OF INVENTION

1. Field of the Invention

The invention relates generally to the field of well logging. More particularly, the invention relates to improved techniques for maintaining positive contact between logging instruments and the borehole wall.

2. Background Art

Various well logging techniques are known in the field of hydrocarbon exploration and production. A significant number of these techniques require continuous positive contact between the logging instrument and the borehole wall in order to acquire high quality data required for accurate formation evaluation.

Numerous wireline tools are known in the art that can provide adequate pad contact with the borehole wall. These technologies typically use articulated sondes, springs, or hydraulic calipers to force pads that are equipped with logging sensors to move outward from the tool body to make contact with borehole walls.

For example, U.S. Pat. No. 4,468,623 issued to Gianzero et al. discloses an earth formation investigating tool that can detect borehole wall features with millimeter resolutions. The tool uses articulated arms to push electrodes into contacts with the wall of the borehole. The electrodes measure the conductivities of the borehole wall as the tool is pulled up the borehole. U.S. Pat. No. 4,567,759 issued to Ekstrom et al. discloses a method and apparatus for producing high resolution image from the data collected by tool described in the Gianzero patent. The apparatus and techniques disclosed in these two patents are known in the art as formation micro imager and sold under the trade name of FMI™ by Schlumberger Technology Corporation (Houston, Tex.). Other wireline tools that can provide high-resolution image of the formation using sensors in contact with the borehole wall include that disclosed in U.S. Pat. No. 6,191,588 B1 issued to Chen.

Many MWD and LWD tools are known that measure various formation and drilling parameters. Most of these tools have sensors mounted on metallic stabilizer-like pads that can withstand the harsh environments while drilling. The pads and the sensors often do not contact the wall of the borehole. One example of these tools is the Resistivity-at-the-Bit (RAB) tool described in U.S. Pat. No. 5,235,285 issued to Clark et al. and U.S. Pat. No. 5,339,037 issued to Bonner et al. On the other hand, the use of contact devices in MWD and LWD tools is limited. MWD or LWD tools that can make contact with the borehole wall typically use simple mechanical protruding devices. These protruding devices may not be able to maintain positive contact with the borehole with varying diameters (due to washouts etc.) or in wells with atypically large diameter boreholes. In addition, deviated wells and sharp doglegs (short radius of curvature bends in the well) can cause eccentering of MWD and LWD tools, leading to loss of contact with a significant portion of the borehole wall. In some situations, the protruding devices may cause problems with respect to the tool trajectory. It is known that the lower portion of a drill string may have a reverse angular velocity relative to the upper portion of the drill string. The reverse velocity may cause the drill string to lock up or may destroy the drilling assembly altogether.

Other LWD or MWD devices maintain borehole contact by keeping a section of the tool housing (or sleeve) stationary in the well, while allowing the drilling assembly located below the sensors to rotate. The section that is kept stationary may include sensors for measuring formation properties while the section is in contact with the borehole wall. One example of such logging tools is disclosed in the published U.S. patent application Ser. No. 2002/0062992 A1 by Fredericks et al. This approach is similar to drill bit steering technologies. The sensors on the stationary section cannot provide 360-degree coverage around the borehole, and the approach is impractical for covering a long stretch of the borehole. Furthermore, tool sticking may occur due to the prolonged stationary contact between the tool and the borehole wall, resulting in expensive and time-consuming fishing operations and/or possible loss of the tool and drilling assembly.

It is therefore desirable to have improved apparatus and methods that can enable MWD and LWD tools to establish and maintain contacts with the borehole wall in wellbore regardless of tool trajectory, borehole diameters, deviation, rugosity, or wash out.

SUMMARY OF INVENTION

In one aspect, embodiments of the invention relate to well logging tools. A well logging tool in accordance with embodiments of the invention includes a housing; at least one piston moveably disposed on the housing; at least one sensor disposed on the at least one piston; a pressure compensation system coupled to the at least one piston such that a pressure at a back side of the at least one piston is substantially identical to a pressure outside the well logging tool; and a piston deployment mechanism for deploying the at least one piston.

In another aspect, embodiments of the invention relate to methods for well logging using a well logging tool having at least one piston disposed on a tool housing and a pressure compensating system that maintains a pressure at a back side of the at least one piston to be substantially identical to a pressure outside the well logging tool, wherein the at least one piston includes at least one sensor. A method in accordance with embodiments of the invention includes disposing the well logging tool in a borehole; deploying the at least one piston to establish contact between the at least one piston and a wall of the borehole; and measuring a formation property using the at least one sensor.

Other aspects and advantages of the invention will be apparent from the following description and the appended claims.

DETAILED DESCRIPTION

Embodiments of the present invention relates to apparatus and methods for providing contacts between logging tools (or sensors) and borehole walls. According to embodiments of the present invention, a logging tool is equipped with one or more pressure compensated pistons to enable one or more sensors to contact the borehole wall. A variety of sensors may be mounted, embedded or encapsulated in the pressure compensated piston.

Figure 1:
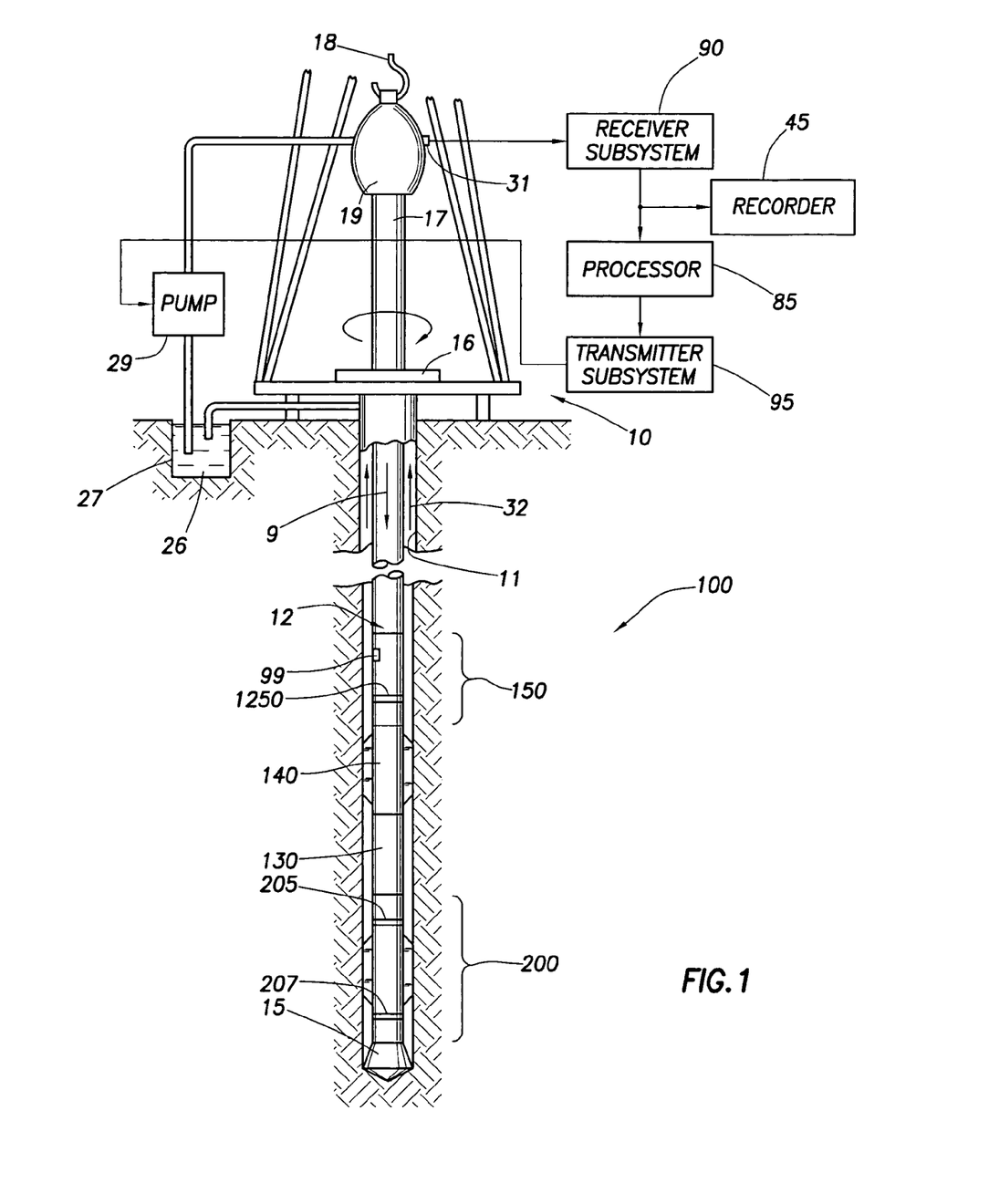
FIG. 1 is logging-while-drilling system in accordance with one embodiment of the invention.

Embodiments of the invention are most useful to MWD or LWD tools. However, one of ordinary skill in the art would appreciate that wireline tools may also benefit from embodiments of the invention. FIG. 1 shows a typical logging-while-drilling (LWD) system that includes a derrick 10 positioned over a wellbore 11. A drilling tool assembly, which includes a drill string 12 and drill bit 15, is disposed in the wellbore 11. The drill string 12 and bit 15 are turned by rotation of a kelly 17 coupled to the upper end of the drill string 12. The kelly 17 is rotated by engagement with a rotary table 16 or the like forming part of the rig 10. The kelly 17 and drill string 12 are suspended by a hook 18 coupled to the kelly 17 by a rotatable swivel 39.

Drilling fluid is stored in a pit 27 and is pumped through the center of the drill string 12 by a mud pump 29 to flow downwardly (shown by arrow 9). After circulation through the bit 15, the drilling fluid circulates upwardly (indicated by arrow 32) through an annular space between the wellbore 11 and the outside of the drill string 12. Flow of the drilling mud lubricates and cools the bit 15 and lifts drill cuttings made by the bit 15 to the surface for collection and disposal.

As shown, a logging tool 100 is connected to the drill string 12. The tool 100 may include a stabilizer 140 and drill collar 130 which mechanically connect a measuring device 200 to the tool 100. In accordance with one embodiment of the invention, the measuring device 200 includes pistons 18 that can be actuated to press sensors (not shown) against the borehole wall. The pistons 18 will be described in more detail in the following sections. Signals measured by the sensors may be transmitted to the surface or stored on memories (not shown) onboard the tool 100.

As shown in FIG. 1, the tool 100 includes a toroidal antenna 1250 for electromagnetic communication with the local measuring device 200. The tool 100 may also include mud telemetry system 150 to transmit signals to the surface. A transducer 31 disposed at the surface detects the pressure variations and relays the signals to a receiver decoder system 90 for demodulation and interpretation. The demodulated signals can be coupled to a processor 85 and recorder 45 for further processing. The surface equipment may optionally include a transmitter subsystem 95 that can modulate the pressure of the drilling mud to communicate control signals to the tool 100.

The deployment of sensors against a borehole wall is essential for some down-hole measurements, such as resistivity measurements. In particular, close contact with the borehole wall is essential for sensors used in formation imaging, for example, those used in tools sold under the trade names of FMI™, OMDT™, and OBMI™ by Schlumberger Technologies Corporation (Houston, Tex.). While the following description refers to resistivity measurements as examples, embodiments of the present invention are not so limited. Other measurements or sensors that could benefit from being placed against the borehole wall include temperature, pressure, drilling mechanics, induction, inductive imager, electromagnetic, galvanic, density, neutron, sonic, natural radioactivity, nuclear magnetic resonance, compressional or shear wave velocity, dipmeter, seismic, etc.

In order to maintain constant contact with the borehole wall, sensors need to be deployed on a mechanism that can accommodate and adapt to changing diameters and shapes of the borehole. For wireline tools, prior art devices typically use articulation arms or the like. However, these deployment devices are often too weak to withstand the forces encountered while drilling. As noted above, some LWD/MWD tools use protruding devices to contact the borehole wall. The protruding devices may cause problems with respect to tool trajectories. That is, the lower portion of a drill string may have a reverse angular velocity relative to the upper portion of the drill string. The reverse velocity may cause the drill string to lock up or may destroy the drilling assembly altogether. Embodiments of the invention use piston mechanisms to deploy the sensors to the wall of the borehole. These piston mechanisms can withstand the forces encountered while drilling. Therefore, embodiments of the invention may be used in wireline and LWD tools.

Figure 2:
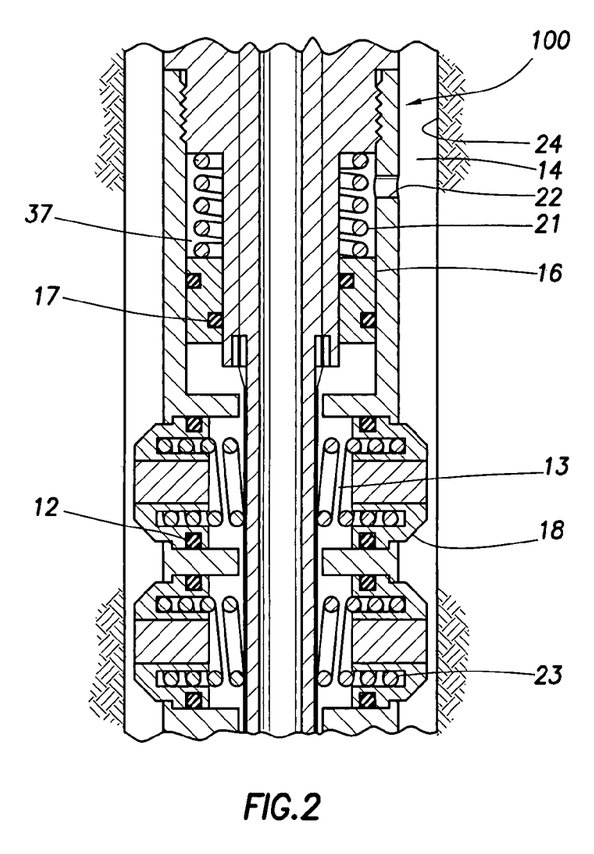
FIG. 2 illustrates a section of a logging tool including pressure-compensated pistons according to one embodiment of the present invention.

FIG. 2 illustrates a section of a tool 100 including pistons 18 according to one embodiment of the present invention. As shown, the tool 100 is disposed in a borehole 14. Four pistons 18 are shown disposed on the tool 100. However, embodiments of the invention are not limited to any specific number or location of the pistons on a tool. The pistons 18 are sealingly and moveably disposed on the tool 100 using one or more seals 12, which may be an O-ring or other device(s) known or appreciated by one of ordinary skill in the art.

One major problem in using a piston and seal in a logging tool is that the seal may not hold up under the high pressure (up to 20,000 psi) and high temperature (300° F. or higher) conditions encountered downhole. One solution to this problem is to provide a pressure compensation mechanism such that the seals 12 do not have to work against a large pressure differential.

As shown in FIG. 2, a pressure compensation mechanism in accordance with one embodiment of the invention comprises a fluid-filled reservoir 13 behind each piston 18, a pressure compensating chamber 37 that is open to the borehole via an opening 22, and a compensating piston 16 separating the fluid-dilled reservoir 13 and the pressure compensating chamber 37. The pressure inside the pressure compensating chamber 37 is substantially identical to that in the borehole because it is open to the borehole via the opening 22. The pressure inside the pressure compensating chamber 37 is transmitted to the fluid-filled reservoir 13 by the compensating piston 16, which is movably disposed between the pressure compensating chamber 37 and the fluid-filled reservoir 13. Accordingly, the pressure inside the fluid-filled reservoir 13 (i.e., at the back side of the piston 18) will always be substantially the same as the pressure in the borehole 14 (i.e., at the front side of the piston 18), and, therefore, the seals 12 need not work against a substantial pressure differential. Although it is possible to open the fluid-filled reservoir 13 directly to the borehole to achieve similar pressure compensation, this approach is not preferred because the borehole fluid would contact seals 12 and the debris or harsh chemicals in the drilling fluids would shorten the lives of the seals 12. One of ordinary skill in the art would appreciate that the fluid-filled reservoir 13 may be filled with a liquid or a gas, though a liquid is preferred.

With the pressure compensation as described above, a tool 100 in accordance with the invention needs only a minimal force to push the pistons 18 out to contact the borehole wall 24. The minimal force, for example, can be supplied by a piston spring 23. Alternatively, the minimal force needed to push the pistons 18 out to contact the borehole wall 24 may be supplied by a compensating spring 21 that exerts a biasing force on the compensating piston 16 such that the pressure inside the fluid-filled reservoir 13 is slightly higher than the pressure of the pressure compensating chamber 37 and the borehole 14. Having a slightly higher pressure in the fluid-filled reservoir 13 relative to the compensating chamber 37 also prevents the drilling fluid from leaking into the fluid-filled reservoir 13 to degrade the seals 12. As shown, the compensating spring 21 is located inside the pressure-compensating chamber 37 to provide a "push" on the compensating piston 16. Alternatively, the compensating spring 21 may be located on the other side of the compensating piston 16 to provide a "pull" on the compensating piston 16. Some embodiments of the invention use a combination of the piston spring 23 and compensating spring 21 to provide the force needed to push the piston 18 out to contact the borehole wall 24. Furthermore, some embodiments of the invention may use mechanical means or drilling fluid pressures to provide the forces to push the pistons 18 out to contact the borehole wall 24. These alternative embodiments will be described in detail in the following sections.

In preferred embodiments, the compensating spring 21 and/or the piston spring 23 have force constants that can provide quick deployment of the pistons. The force constants of these springs are related to the revolution period of the drill string. Specifically, the time needed to extend a piston from a fully compressed to a fully extended state is preferably shorter than the rotation period (preferably, 2–3 times faster than the drill string rotation) such that the piston can extend fast enough to avoid merely floating at a distance from the borehole wall due to variations in or protrusions from the borehole wall. For example, when a piston hits a protrusion during a drill string rotation, the piston will compress (retract). The piston should then quickly extend to maintain close contact with the borehole wall on the back side of the protrusion.

As shown in FIG. 2, the pressure-compensating chamber 37 and the fluid-filled reservoir 13 are formed between an inner mandrel 15 and the outside wall of the tool body. In addition, the compensating pistons 16 are sealingly and moveably disposed between the outside wall of the tool and the inner mandrel 15. This embodiment is only for illustration. One of ordinary skill in the art would appreciate that various modifications are possible without departing from the scope of the invention. For example, the pressure compensating chamber 37 and the fluid filled reservoir 13 may be formed entirely within the tool body, without relying on the inner mandrel 15.

The pressure compensating chamber 37 and the fluid-filled reservoir 13 each may be a continuous chamber around the periphery of the tool 100. Alternatively, the pressure compensating chamber 37 and the fluid-filled reservoir 13 each may comprise multiple chambers. If the pressure compensating chamber 37 is a continuous chamber, then only one opening 22 is required. The fluid-filled reservoir 13 may be filled with any hydraulic fluid, for example, oils.

Seals 17 are disposed on the compensating pistons 16 to provide fluid isolation between the pressure-compensating chamber 37 and the fluid-filled reservoir 13. Like seals 12, seals 17 need not work against a substantial pressure differential.

Figure 3:
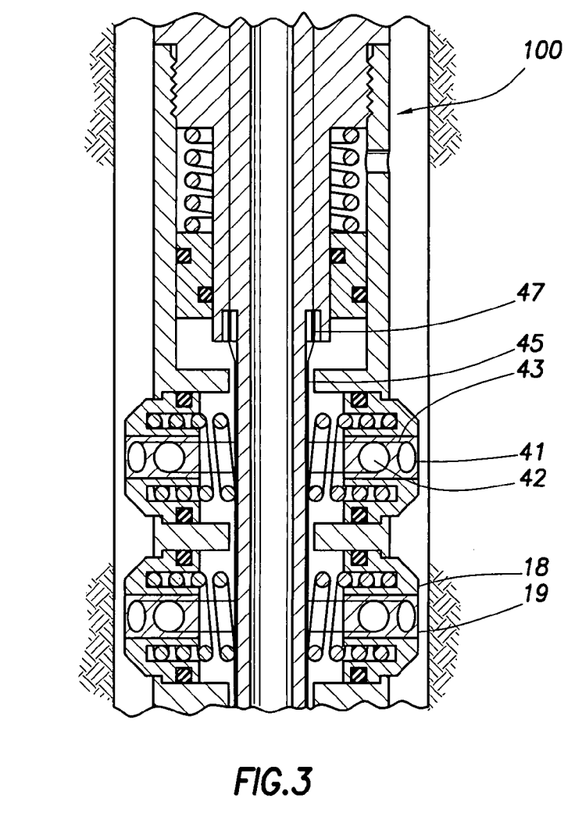
FIG. 3 illustrates a section of a logging tool including pressure-compensated pistons and sensors according to one embodiment of the present invention.

FIG. 3 illustrates how sensors for formation logging may be attached to the pressure compensated pistons 18 on a logging tool 100 according to one embodiment of the invention. As shown, two sensors 41, 42 are included on each encapsulation 19, which is disposed on pistons 18. The use of encapsulation 19 on pistons 18 may facilitate the switching or repair of various sensors. One of ordinary skill in the art would appreciate that the number and type of sensors would depend on the desired application and should not limit the scope of the present invention. The sensors 41, 42 may be mounted on, embedded in, or encapsulated inside the encapsulations 19. The exact method of attachment and location of the sensors depend on the type of sensor used. To increase the life of the sensors, the encapsulations 19 and the pistons 18 may be coated with an abrasive-resistant material, such as metal carbides (e.g., tungsten carbide), polycrystalline diamond (PCD), and metal nitrides. However, the hard-facing materials are not required for the pistons in accordance with the invention because these pistons are pressed against the wall of the borehole with minimum forces from the springs. The abrasive action is expected to be minimal.

As shown, the sensors 41, 42 are connected by wires 43 to the wiring system 45 in the tool. The wiring system 45 may provide power to the sensors 41, 42 and transmit signals detected by the sensors 41, 42 to the memories on the tool or to the telemetry system. The wiring system 45 is connected to other electrical systems in the tool via a bulkhead 47.

Figure 4:
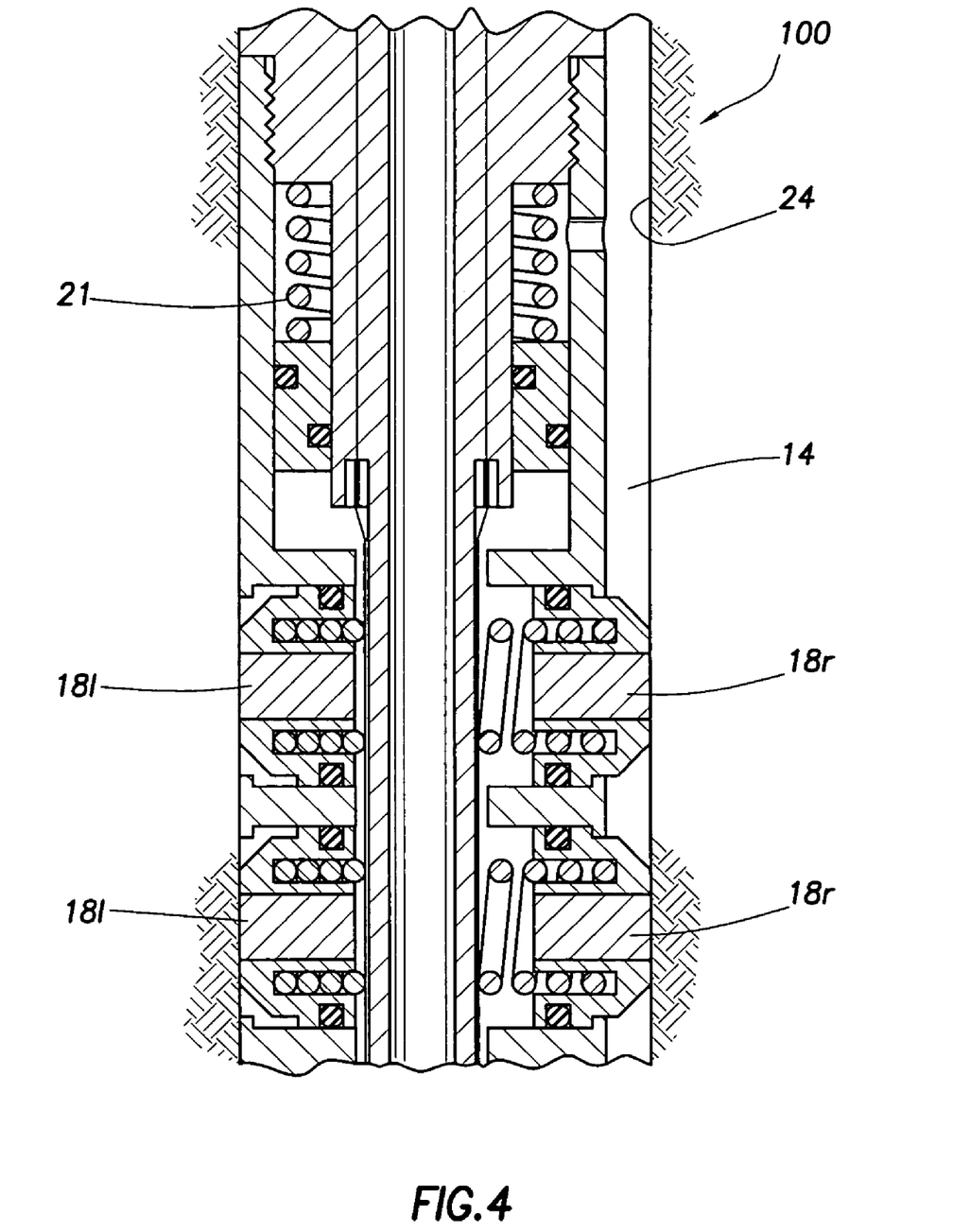
FIG. 4 illustrates a logging tool including pressure-compensated pistons according to one embodiment of the present invention disposed in a borehole in an eccentered position.

In accordance with embodiments of the invention, the piston spring 23 and/or the compensating spring 21 provides the force to extend the pistons to contact the borehole wall 24. Pistons in accordance with embodiments of the invention may achieve such contacts regardless of the location (or eccentering) of the tool 100 in the borehole 14 or the sizes and shapes of the borehole 14. FIG. 4 shows that if the tool 100 is eccentered in the borehole 14, the pistons 18r, 18l may extend to different extents to accommodate the different standoffs on different sides of the tool. Tool eccentering could occur for various reasons, including borehole curvature, horizontal borehole, and doglegs. As shown, the tool 100 is eccentered to the left. Therefore, the pistons on the right 18r need to extend more in order to reach the borehole wall 24. In contrast, the pistons on the left 18l do not have to extend much (or at all) to contact the borehole wall 24. The different extension length of the pistons is automatically accomplished with the pressure compensation. Different piston extension length may also arise when the borehole has irregular shapes (e.g., washout on one side) or sizes. Therefore, a tool 100 in accordance with embodiments of the invention can maintain contact with the borehole wall regardless of the tool location in the borehole or various sizes and shapes of the borehole.

Figure 5A:
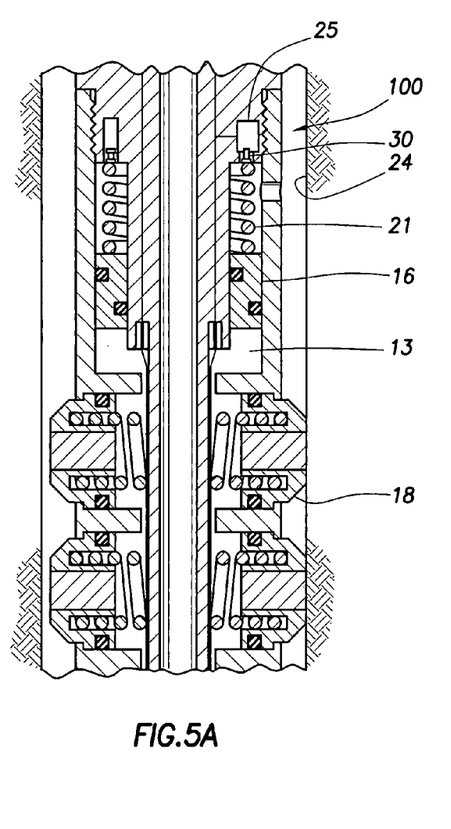
FIG. 5A illustrates a variation of a logging tool including pressure-compensated pistons according to one embodiment of the present invention.

One of ordinary skill in the art would appreciate that the tools shown in FIGS. 2 and 3 are for illustration only, and other modifications are possible without departing from the scope of the invention. For example, FIG. 5A shows an alternative embodiment that includes a controller device 25 for regulating the tension of the compensating spring 21. The controller device 25 may comprise a motor or pump. The motor or pump may be powered by a down-hole battery or by hydraulics. The control signals sent to the controller device 25 to regulate the tension of the compensating spring 21 may be electrical or hydraulic (e.g., mud pulse telemetry).

Several mechanisms are possible by which the controller device 25 can regulate the tension of the compensating spring 21. For example, the controller device 25 may control a mechanical means 30, which in turn regulates the tension of the compensating spring 21. The mechanical means 30 may be a piston cylinder, a ratcheting device, a rack and pinion device, a screw or bolt mechanism, a jacking or cranking mechanism, a gear mechanism or a combination of these devices (or other means to initiate alternating back and forth movement that would be appreciated by one of ordinary skill in the art). The mechanical means 30 may be actuated by an electric or hydraulic motor or pump or directly by pump pressure, mud pulse telemetry or mud flow. By actuating the mechanical means 30, a positive or negative force may be applied to the compensating spring 21 to increase or decrease the tension of the compensating spring 21. The tension of the compensating spring 21 regulates the bias of the compensating piston 16, which in turn regulates the pressure inside the fluid-filled reservoir 13. The pressure inside the fluid-filled reservoir 13, relative to the borehole pressure, can then regulate the extension or retraction of the pistons 18.

Figure 5B:
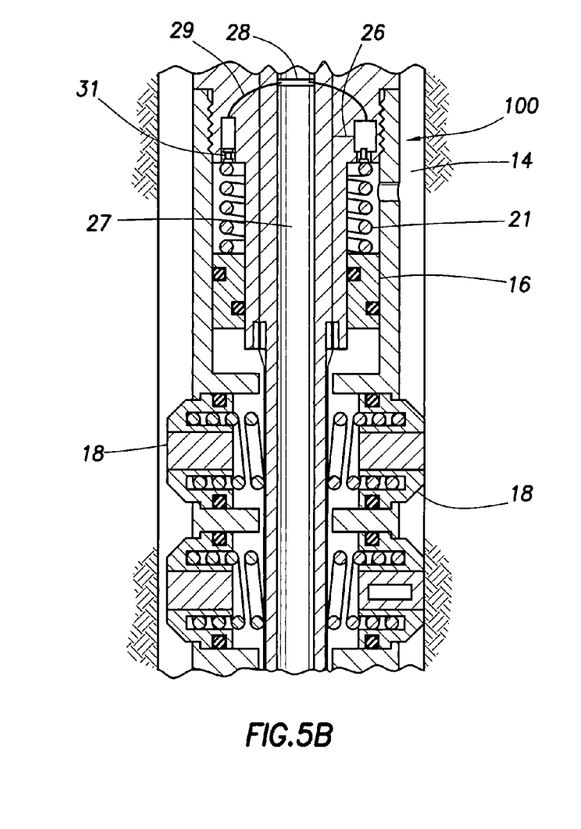
FIG. 5B illustrates another variation of a logging tool including pressure-compensated pistons according to one embodiment of the present invention.

In another embodiment, shown in FIG. 5B, the force exerted by the compensating spring 21 may be controlled by the mud (or drilling fluid) flowing through the mud channel 27 of the tool 100. In this embodiment, the high pressure mud in the mud channel 27 is partially diverted, by a selective flow diverter 28, through the fluid conduit 29 and returned to the borehole 14. Prior to returning to the borehole 14, the mud flow is partially restricted by a tension transfer device 31 resulting in a continuous positive (or negative) pressure or force being applied to one side of the tension transfer device 31 (or some other device that would be appreciated by one of ordinary skill in the art). The tension transfer device 31 is attached to the compensating spring 21 to regulate the tension of the compensating spring 21.

The above described is only an example of how the mud pressure may be used to regulate the tension of the compensating spring 21. One of ordinary skill in the art would appreciate that other mechanisms may also be used to harness the pressure from the mud flow to provide mechanical forces. For example, a mechanism used in a rotary steerable system sold under the trade name of PowerDrive™ by Schlumberger Technologies Corporation (Houston, Tex.) could be modified to accomplish the aforementioned transfer of force.

Use of a controller device 25, in conjunction with a mechanical means 30, or use of mud flow to activate a tension transfer device 31 allows for regulation of the tension of the compensating spring 21 during logging operations. The ability to regulate the tension of the compensating spring 21, and hence the piston protrusion, is useful if unexpected conditions are encountered during drilling and increased tension are needed to maintain piston contact with the borehole wall. In addition, the ability to retract pistons 18 makes it easier to deploy or retrieve the tool 100.

In addition, one of ordinary skill in the art would appreciate that the controller device 25, in conjunction with a mechanical means 30, or the mud flow tension transfer device 31 may be adapted to eliminate the need for a compensating spring 21. That is, the positive or negative force regulation may be applied directly to the compensating piston 16, without the need for the compensating spring 21. Furthermore, the force regulation mechanism may be applied directly to the piston spring 23 or directly to the pistons 18, eliminating the need for the piston spring 23.

On an LWD tool, the pistons 18 and the sensors 41 and 42 rotate with the tool 100 during drilling. The rotation allows the sensors 41 and 42 to have 360-degree coverage of the borehole wall 24. The 360-degree coverage and the constant positive contact with the borehole wall 24 ensure that continuous, high-resolution data may be acquired.

Figure 6:
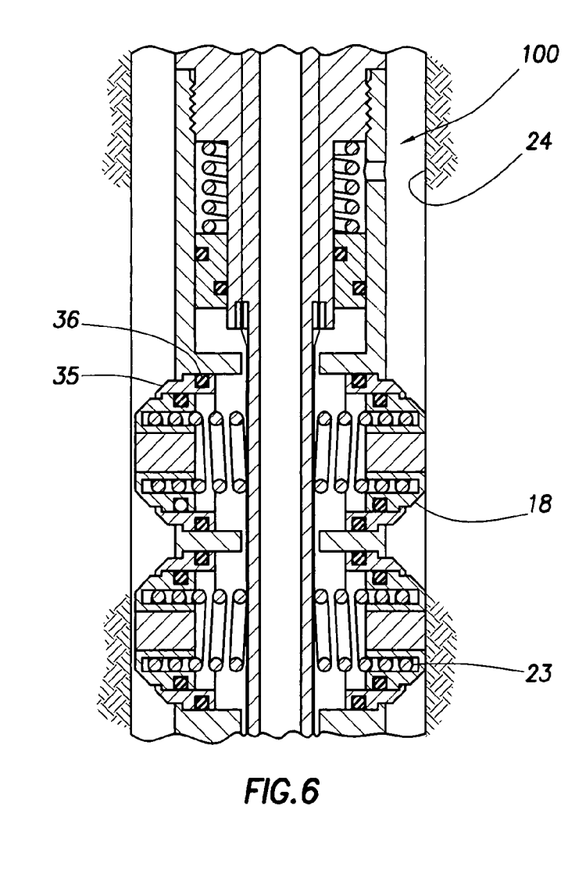
FIG. 6 illustrates another variation of a logging tool including pressure-compensated pistons according to one embodiment of the present invention.

FIG. 6 illustrates another embodiment of the present invention. As shown, the tool 100 includes nested pistons 18 to accommodate large diameter boreholes or well bores having washed out zones. In this situation, the distance between the tool 100 and the borehole wall 24 may be larger than typically encountered. In order to compensate for the increased distance, pistons 18 are nested in piston liners 35, which may be extended/retracted together with or independent of pistons 18. Seals 36 are disposed between the body of the tool 100 and the piston liner 35 to isolate the fluid-filled reservoir 13 from the borehole 14. In some embodiments, more than one piston liner 35 may be nested inside each other to provide even father reach, in a telescope-like manner.

Figure 7:
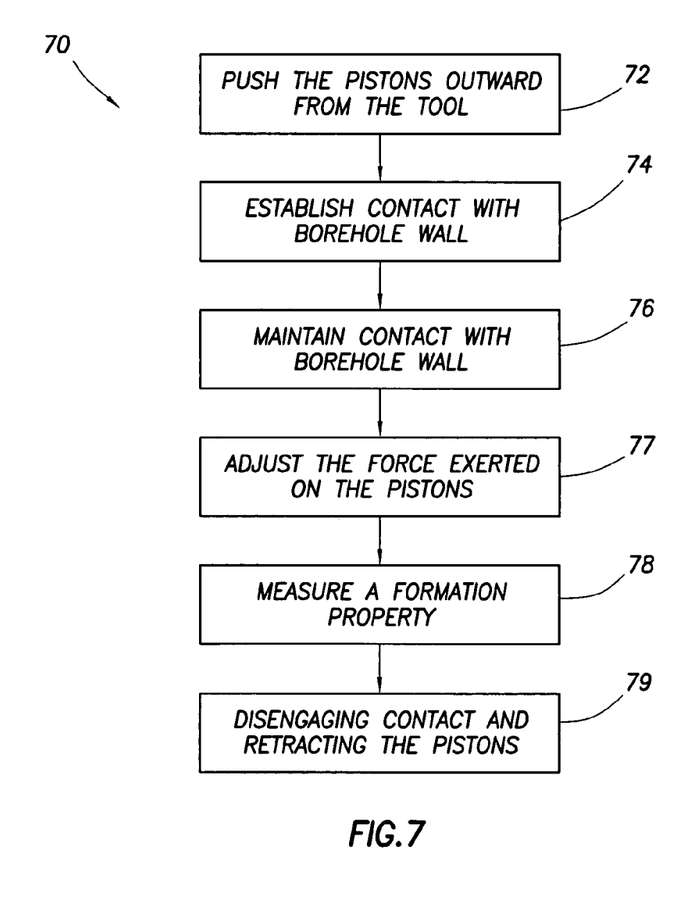
FIG. 7 illustrates a method for well logging according to one embodiment of the present invention.

FIG. 7 illustrates a method 70 for well logging in accordance with one embodiment of the present invention. The flow chart in FIG. 7 depicts the process by which positive contact with a borehole wall may be established and maintained using pressure-compensated pistons on a well logging tool. After a well logging tool is disposed in a borehole, the pistons, which may include one or more sensors, are pushed outward from the tool body (step 72). The pistons may be pushed out by any piston deployment mechanism including spring force, hydraulic pressure, or any mechanical mechanism described above. In accordance with embodiments of the invention, the pistons are pressure balanced such that the pistons do not work against the high pressure typically encountered downhole.

Next, positive contact is established between the piston and the borehole wall (step 74). The pistons of the invention, when pushed out, will extend outward until they hit the borehole wall. Thus, the establishment of the contact is automatic. Because the force used to push the pistons outward is minimal, the pistons will stop after establishing contacts with the borehole wall and there will be no unnecessary compression on the pistons or the borehole wall.

The method also allows for the maintenance of positive contact regardless of the varying conditions that may be encountered downhole, e.g., borehole washout or rugose hole (step 76). Because the pistons can move independently of each other, they can easily conform to the wash outs and borehole rugosity and prevent loss of data quality.

Another condition that may be encountered downhole is a large diameter well bore, which may occur by design or result from severe wash out. A tool as shown in FIG. 6 is particular useful in a large diameter borehole. This tool is able to extend farther out and maintain contact with the borehole wall. This would allow the drilling and/or logging sensors to acquire quality data that might actually aid in determining why the wash outs are occurring and in turn help to reduce their occurrence.

In some embodiments, the method optionally allows for adjustment, while downhole, of the force ultimately exerted on the piston by adjusting the tension on the compensating spring (step 77). This allows for an increased range of force to be used to maintain positive contact between the pistons and the borehole wall.

Once the pistons and the sensors are in contact with the borehole wall, logging operation may commence (step 78). The pressure compensation pistons in accordance with the invention will ensure that the sensors are close to the borehole wall and good-quality data may be obtained. The sensors used depend on the type of formation properties to be measured. For example, the sensor may be one selected from a temperature sensor, a pressure sensor, a resistivity sensor, an inductive imager, a density sensor, a neutron sensor, a sonic sensor, a nuclear magnetic resonance sensor, a dipmeter, and a seismic sensor.

Finally, the method allows for the disengaging and retracting of the piston (step 79). By reducing the outward force on the piston, the piston can be disengaged from the borehole wall. If the outward force is further reduced, the piston can fully retract inwardly toward the tool body. Disengagement and retraction of the pistons are desirable when deploying or retrieving the tool. To disengage or retract the pistons, the pressure inside the fluid-filled chamber (shown as 13 in FIG. 2) is reduced. This may be accomplished by adjusting the tension of the compensating spring (shown as 21 in FIG. 5A), for example, using a controller device described above (shown as 25 in FIG. 5A).

The advantages of the present invention may include one or more of the following. A tool in accordance with the invention has pistons to convey sensors to be in contact with the borehole wall. The pistons are pressure compensated such that the pistons do not need to work against high pressures encountered downhole. Pressure compensation also permits minimal force to be used to deploy the pistons, to maintain piston contact with the borehole wall, and to allow the sensor to conform to wash outs and borehole rugosity as well as larger diameter boreholes. In addition, because the contact with the borehole wall involves only minimal surface area there is a reduced risk of tool sticking.

While the invention has been described with respect to a limited number of embodiments, those skilled in the art, having benefit of this disclosure, will appreciate that other embodiments can be devised which do not depart from the scope of the invention as disclosed herein. For example, the present invention may be adapted for use in a wireline device. Accordingly, the scope of the invention should be limited only by the attached claims.

The invention claimed is:

1. A well logging tool, comprising:
   a housing;
   at least one piston moveably disposed on the housing;
   at least one sensor disposed on the at least one piston;
   a pressure compensation system operatively coupled to the at least one piston such that a pressure at a back side of the at least one piston is substantially identical to a pressure outside the well logging tool; and
   a piston deployment mechanism for deploying the at least one piston.

2. The well logging tool of claim 1, wherein the piston deployment mechanism comprises a piston spring disposed at the back side of the at least one piston.

3. The well logging tool of claim 1, wherein the pressure compensation system comprises a pressure-compensating chamber having an opening to an exterior of the housing, a fluid-filled reservoir, and a compensating piston moveably disposed between the pressure-compensating chamber and the fluid-filled reservoir such that a pressure inside the pressure-compensating chamber and a pressure inside the fluid-filled reservoir are substantially identical.

4. The well logging tool of claim 3, further comprising a compensating spring connected to the compensating piston for exerting a force on the compensating piston.

5. The well logging tool of claim 4, wherein the piston deployment mechanism comprises a piston spring disposed at the back side of the at least one piston.

6. The well logging tool of claim 1, further comprising at least one piston liner moveably disposed between the housing and the at least one piston for extending a reach of the at least one piston.

7. The well logging tool of claim 4, further comprising a controller connected to the compensating spring for regulating the force exerted by the compensating spring.

8. The well logging tool of claim 7, wherein the controller is operated by a motor.

9. The well logging tool of claim 7, wherein the controller is operated by hydraulic pressure of drilling fluids.

10. A well logging tool, comprising:
    a housing;
    at least one piston moveably disposed on the housing;
    at least one sensor disposed on the at least one piston;
    means for keeping a pressure at a back side of the at least one piston substantially identical to a pressure outside the well logging tool; and
    means for deploying the at least one piston.

11. A method for well logging, the method comprising:
    disposing a well logging tool in a borehole, the well logging tool having at least one piston carrying a sensor;
    maintaining a pressure at a backside of the at least one piston substantially equal to a pressure outside of tie well logging tool;
    deploying the at least one piston to establish contact between the ax least one piston and a wall of the borehole, and
    measuring a formation property using the at least one sensor.

12. The method of claim 11, wherein the deploying comprises exerting a force on the back side of the at least one piston by a spring.

13. The method of claim 11, wherein the deploying comprises using a hydraulic pressure of a drilling fluid.

14. The method of claim 11, the measuring was performed while drilling.

15. The method of claim 11, wherein the at least one sensor is selected from a temperature sensor, a pressure sensor, a resistivity sensor, an inductive imager, a density sensor, a neutron sensor, a sonic sensor, a nuclear magnetic resonance sensor, a dipmeter, and a seismic sensor.

* * * * *